Nov. 28, 1950     L. E. DAUBENMEYER     2,531,907
PRESSURE FLUID SERVOMOTOR
Filed Feb. 1, 1946     2 Sheets-Sheet 1
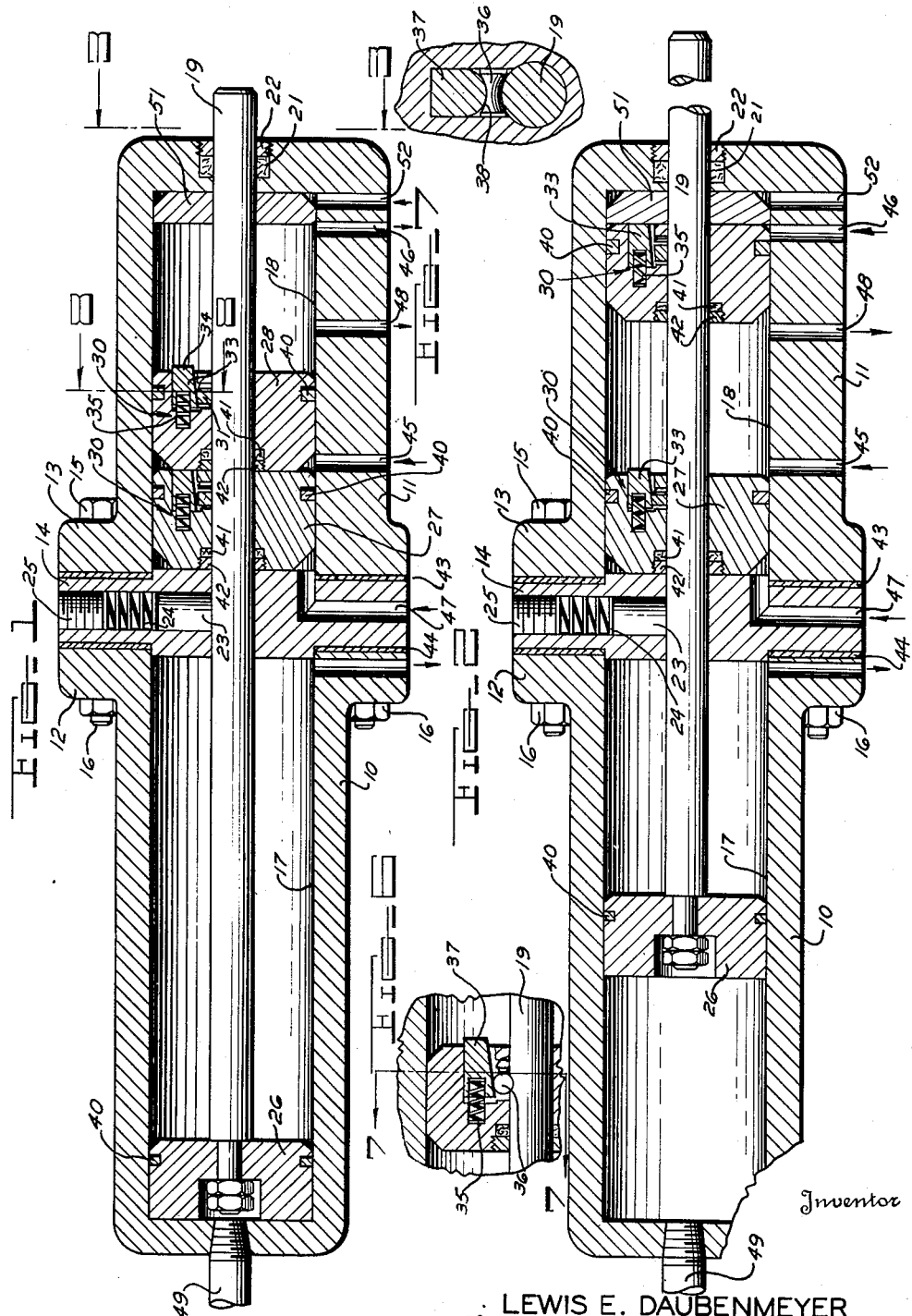
Inventor
LEWIS E. DAUBENMEYER
By Arthur M. Smith
Attorney Nov. 28, 1950 — L. E. DAUBENMEYER — 2,531,907
PRESSURE FLUID SERVOMOTOR
Filed Feb. 1, 1946 — 2 Sheets-Sheet 2
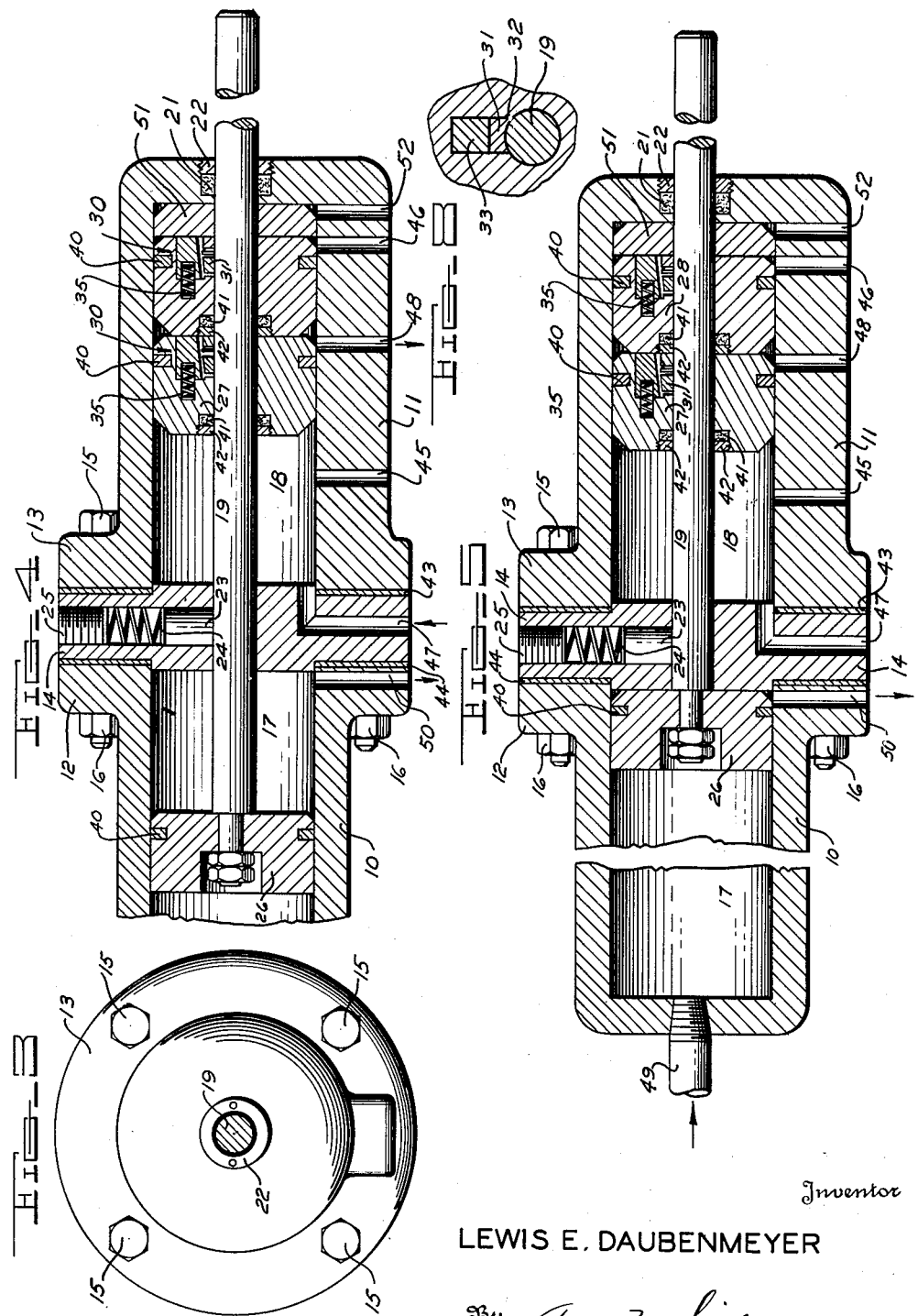
Inventor
LEWIS E. DAUBENMEYER
By Arthur M. Smith
Attorney Patented Nov. 28, 1950

2,531,907

UNITED STATES PATENT OFFICE 2,531,907

PRESSURE FLUID SERVOMOTOR

Lewis E. Daubenmeyer, Dearborn, Mich.

Application February 1, 1946, Serial No. 644,815

9 Claims. (Cl. 121—38)

1

The present invention relates to a pressure fluid servo-motor, and more particular to such a motor of the incremental stroke type.

In various applications of pressure fluid servomotors, it is necessary to provide for incremental movement of the piston rod in which each movement is a fixed and predetermined increment of the total stroke of the piston. This condition is encountered frequently in machine tool operations in which a jig or fixture is indexed into predetermined positions and held in such a position by an hydraulic pressure fluid servo-motor. Prior to the present invention, such operations required mechanical as well as hydraulic or electrical indexing and holding members because of the difficulty of controlling the operation of the hydraulic power servo-motor within fixed limits.

It is therefore a principal object of the present invention to provide an hydraulic power servo-motor of the incremental stroke type in which provision is made so that each increment of the stroke has a fixed and predetermined length which will be repeated during each operating cycle of the servo-motor.

It is a further object of the present invention to provide an hydraulic power servo-motor of the incremental stroke type which is of a novel and simplified construction, and which is characterized by the positive operating characteristics of the motor which permits simplification of the control system of the entire machine in which the motor is to be used.

Other objects of this invention will appear in the following description and appended claims, reference being had to the accompanying drawings forming a part of this specification wherein like reference characters designate corresponding parts in the several views.

In the drawings:

Fig. 1 is a longitudinal section through an hydraulic power servo-motor of the present invention, and showing the various parts thereof at the beginning of the power stroke.

Fig. 2 is a view generally similar to Fig. 1, but with parts broken away and showing the various parts of the servo-motor at the completion of the first increment of the power stroke.

Fig. 3 is an end elevation looking in the direction of the arrows 3—3 in Fig. 1.

Figs. 4 and 5 are fragmentary longitudinal sections somewhat reduced in scale, but otherwise similar to Figs. 1 and 2, but showing the various parts of the hydraulic power servo-motor of the present invention respectively at the completion

2 of the second increment of its stroke, and at the end of the final stroke.

Fig. 6 is a fragmentary longitudinal section showing a modification of the construction shown in Figs. 1, 2, 4, and 5.

Fig. 7 is a section taken substantially on the line 7—7 in the direction of the arrows in Fig. 6.

Fig. 8 is a section taken substantially on the line 8—8 in the directions of the arrows in Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

An hydraulic power servo-motor of the present invention preferably is constructed of flanged cup shaped body elements 10 and 11, whose flanged end portions 12 and 13 face each other and abut the opposite faces of a bridge 14. The flanged end portions 12 and 13 are connected with the bridge 14 and each other by a plurality of machine bolts 15 which extend through flanges 12 and 13 and the bridge 14 and are each engaged by a machine nut 16. If desired, one of the flanges may be tapped and threaded, while the other flange is bored, so as to prevent the use of the other types of fastening elements and eliminate the need for separate machine bolts 15 and machine nuts 16.

The interior chambers of the flanged cup shaped body elements 10 and 11 are suitably finished to provide the walls of the piston chambers 17 and 18. A piston rod 19 extends through the end of the flanged cup shaped body element 11 and is sealed against leakage of hydraulic power fluid by the packing ring 21 and the adjustable packing nut 22. The piston rod 19 extends through the piston chambers 17 and 18 and extends through the bridge member 14, by which it is both supported and guided. In order to prevent movement of the piston rod 19 except upon power actuation of the pistons, the rod is frictionally engaged in the bridge member 14 by a resiliently mounted friction element 23, having one end in sliding contact with the surface of the piston rod 19, and having its other end in contact with a compression spring 24. Adjustment of the amount of frictional engagement of the piston rod 19 is effected by adjustment of a screw threaded spring adjustment plug 25. This adjustment is provided so as to selectively increase or decrease the frictional engagement between the friction element 23 and the surface for the piston rod 19.

A piston 26 is fixed to the end of the piston rod 19, and reciprocates in the piston chamber 17. Pistons 27 and 28, mounted for reciprocation in the piston chamber 18, are carried by the piston rod 19 and are releasably connected with the piston rod 19 to effect its power movement in one direction for a predetermined distance and to release the piston rod 19 upon the completion of such movement.

While two pistons 27 and 28 are here shown, by way of example, it is to be understood that any desired number of such pistons may be employed, depending upon the number of incremental power strokes desired. The construction here shown is designed to provide a power stroke in one direction having three increments of movement, the first being effected by the movement of the piston 28 from the position shown in Fig. 1 to that shown in Fig. 2. The second being effected by movement of piston 27 from the position shown in Fig. 2 to that shown in Fig. 4. The third increment of movement is effected by movement of the piston 26 from the position shown in Fig. 4, to that shown in Fig. 5. The total movement of the piston rod 19 is limited by the stroke of the piston 26 in the piston chamber 17, while the incremental movements of the piston rod 19 are limited by the amount of permitted movement of pistons 27 and 28 in the piston chamber 18. While the piston construction here disclosed is designed to effect an incremental movement of the piston rod in one direction, it is to be understood that by simple changes, the rod may be moved the full stroke in one direction by operation of the piston 26, and may be returned in incremental amounts by movement of the pistons 27 and 28. Such operation would require simple adjustments which are within the purview of any mechanic skilled in the art, and such changes would consist chiefly in reversing the pistons 27 and 28 on the piston rod 19, so that they would face the opposite directions from that here shown and by regulating the flow of hydraulic pressure fluid accordingly.

Each of the pistons 27 and 28 are connected with the piston rod 19 during their power strokes and are automatically released therefrom at the completion of their power strokes. This is accomplished by the provision of a plurality of locking dog members 30, which are preferably spaced circumferentially of the piston rod 19, and carried by the pistons 27 and 28. In the present embodiment, four or more such locking dog members 30 are provided on each of the pistons 27 and 28, depending on the size of the piston rod, although in the interest of clarity, I have shown but one such locking dog members 30 on each of said pistons.

The locking dog members 30 each comprise a locking wedge member 31 having a curved face 32 adapted to engage the curved surface of the piston rod 19. The surface 32 of the locking wedge 31 is maintained in driving contact with the surface of the piston rod 19 by a contacting wedge member 33 having an extended end portion 34. The contacting wedge member 33 is held against the locking wedge 31 to hold the surface 32 thereof in frictional driving contact with the surface of the piston rod 19. This is accomplished by provision of a coil spring 37 which exerts a pressure on the contacting wedge member 33 holding it into wedging engagement with the locking wedge 31.

When the pistons 27 and 28 reach the end of their permitted strokes, the extending end portions 34 of the contacting wedge members 33 are pushed inwardly against the coil springs 35, as shown in Fig. 5, and the locking wedge member 31 is released from driving engagement with the piston rod 19. As the locking dogs 30 are released the piston rod 19 is then free to move in response to the driving forces applied thereto through the other pistons which are then in driving engagement therewith.

A modified form of locking dog member 30 is shown in Figs. 6 and 7. As there shown, the locking wedge 31 is replaced by a concavely curved roller 36 which is held in frictional driving contact with the convexly curved surface of the piston rod 19. A wedge member 37 is provided for engaging the curved roller 36 and is provided with a curved roller engaging face 38 which engages the concavely curved surface of the roller 36. Otherwise, the construction is the same as that previously described in connection with the locking dog members 30, as shown in the other figures. The operation of the modified form of locking dogs 30 as shown in Figs. 6 and 7 is the same as that described in connection with the members as shown in the other figures.

To prevent by-passing of hydraulic fluid in the piston chambers 17 and 18, a conventional type of piston ring 40 is provided on each of the pistons 26, 27 and 28. Leakage of hydraulic pressure fluid through the pistons 27 and 28 is prevented by a packing ring 41 and an adjustable packing nut 42 provided on each piston and surrounding the piston rod 19. Leakage of hydraulic pressure fluid between the flanged cup shaped body elements 10 and 11 and the bridge 14 is prevented by gaskets 43 and 44 and the structural formation of the bridge member and the piston chambers 17 and 18 which provides a tight metal to metal contact at the points of unison.

The piston rod 19 is power driven by hydraulic pressure fluid from any suitable conventional source thereof (not shown) acting on the pistons 28, 27 and 26 in that order. The flow of pressure fluid is controlled by any conventional type of hydraulic control valve (not shown) which is adapted to direct the flow of the hydraulic pressure fluid as desired to effect operation of the said pistons and the movement of the piston rod 19. With the parts in the position shown in Fig. 1, the power cylinder is ready for its power stroke. Hydraulic pressure fluid is supplied to an intake port 45 as indicated by the arrow, and acts on the the cylinder. During this time hydraulic fluid is exhausted through the exhaust port 46 as indicated by the arrows. When the piston 28 reaches the end of its stroke, as shown in Fig. 2, piston 28 causing it to move towards the end of the forces of the hydraulic pressure fluid on its opposite face causes the movement of the wedge member 33 and the release of the dogs 30, so that the piston rod 19 is free to move relative to the piston 28. After completion of this movement of piston 28, shown in Fig. 2, hydraulic pressure fluid is then delivered to intake port 47 as indicated by the arrow, and a force is applied to the piston 27 to effect its movement toward the piston 28. During this movement of piston 27, hydraulic fluid is exhausted through the exhaust port 48 as indicated by the arrow. When the piston 27 reaches the end of its permitted stroke, the end of the wedge member 33 contacts the adjacent surface of the piston 28, releasing the dog 30 and freeing the piston rod 19 for movement relative thereto. After the completion of the movement of the piston 27, as shown in Fig. 4, hydraulic pressure fluid is delivered to the intake 49 as indicated by the arrow and force is applied to piston 26 to complete its movement toward the bridge 14. During this movement of piston 26, hydraulic fluid is exhausted through an exhaust port 50 as indicated by the arrow.

The supply of hydraulic pressure fluid to effect operation of the pistons 28, 27 and 26 is controlled in any suitable conventional manner to assure the timed operation thereof in the above described sequence. Since such controls include a large number of well known conventional devices they are not shown in the drawings.

As here shown, the diameter of the piston chamber 17 and 18 are the same and the diameter of the pistons 26, 27 and 28 also are the same. It is to be understood however, that the diameters of the piston chambers 17 and 18 and of the piston 26 relative to the pistons 27 and 28 may be changed or varied according to the power requirements.

The amount of incremental movement of the piston rod 19 is determined by the thickness of the pistons 27 and 28 and the length of the piston chamber 18. By varying the thickness of pistons 27 and 28, relative to the length of the chamber 18 the increments of movement may be varied. These are factors of design which will be determined for each cylinder and fixed in accordance with the desired operation thereof.

At the completion of the incremental power stroke as above described, the pistons 26, 27 and 28 are returned from the position shown in Figure 5 to the position shown in Figure 1. This may be accomplished with a single stroke by introducing hydraulic fluid simultaneously into the exhaust ports 46, 48 and 50. During the return stroke the fluid is exhausted through the intake ports 45, 47 and 49. If desired, the pistons 26, 27 and 28 may be returned separately by supplying the hydraulic pressure fluid selectively to the exhaust ports 46, 48 and 50 at different times.

If the power unit is manually controlled, it is possible that an operator might return either or both of the pistons 27 and 28 before returning the piston 26 to its starting position. If the return stroke of the pistons is automatically controlled, and the control should fail to function properly, it is possible that the pistons 27 and 28 might be returned before piston 26 was returned. In this condition the unit would be rendered inoperative until the locking dogs 30 of the pistons 27 and 28 are released so that the piston rod 19 can move relative thereto on the return stroke of the piston 26. In order to reestablish the desired relative positions of the pistons 26, 27 and 28 in the happening of any such event, I provide a release piston 51 which is loosely mounted on the piston rod 19 and which may be moved into position to contact the end 34 of the wedge member 33 of the locking dog 30 of piston 28 to release the engagement of the piston on the piston rod 19. In the event that the piston 27 is frictionally engaged with the piston rod 19 at this time, the continued return movement of the piston 28 will release the locking dogs 30 of piston 27 and thus free the piston rod 19 to permit its movement and allow the return of the piston 26 to its starting position.

The release piston 51 is moved to releasing position by hydraulic pressure fluid supplied through an intake port 52 as indicated by the directional arrow. The release piston 51 will be returned to the position shown in the drawings when piston 28 completes its power stroke.

From the foregoing it will be seen that I have provided an hydraulic power servo-motor which is adapted to permit the movement of the piston rod in a succession of incremental feeding strokes, each of which may be separately controlled both as to time and as to the amount of the stroke so as to move the piston rod 19 through its power stroke in a succession of separate increments thereof.

I claim:

1. An hydraulic motor comprising a pair of cylinders, a piston rod extending through said pair of cylinders, a piston fixed to said piston rod and moveable in one of said cylinders, a moveable piston slidably mounted on said piston rod and moveable in the other of said cylinders, a lock for connecting said moveable piston and said piston rod for operation as a unit and including a locking dog having a wedging friction exerting member carried by said moveable piston and engaging the surface of said piston rod, means for releasing said lock to permit movement of said piston rod relative to said piston and including a moveable member contacting said wedging friction exerting member to increase its frictional engagement with said piston rod when moved in one direction during the power stroke of said moveable piston and to release when the frictional engagement with said piston rod when moved in the opposite direction at the end of the power stroke of said moveable piston, and an hydraulic circuit for supplying hydraulic pressure fluid selectively to said fixed piston and to said moveable piston.

2. An hydraulic motor as claimed in claim 1 and further characterized in that said wedging friction exerting member carried by said moveable piston and engaging the surface of said piston rod comprises a wedge member having an arcuate face engaging the curved face of said piston rod.

3. An hydraulic motor as claimed in claim 1 and further characterized in that said wedging friction exerting member carried by said moveable piston and engaging the surface of said piston rod includes a concave roller member adapted to engage the convex face of said piston rod.

4. An hydraulic motor adapted to provide a power stroke divided into fixed predetermined increments and comprising a divided piston chamber, a piston rod reciprocally mounted in said chamber and having one end extending outwardly therefrom, a piston fixed to the other end of said piston rod and moveable in one part of said divided chamber and a moveable piston mounted in another part of said piston chamber and carried on said piston rod intermediate its end, and a releasable lock carried by said moveable piston for selectively connecting said piston to drive said piston rod during a power stroke of said moveable piston and to release said piston rod for movement by said first-named piston at the completion of the power stroke of said moveable piston, said lock including a locking dog having a wedging friction exerting member carried by said moveable piston and engaging the surface of said piston rod and a releasable member for urging said wedging friction exerting member towards its locking position to increase its frictional engagement with said piston rod during the power stroke of said moveable piston and for urging said member in the opposite direction to release the frictional engagement with said piston rod at the end of the power strike of said moveable piston, and a plurality of hydraulic fluid inlet and outlet ports communicating with the parts of said divided piston chamber and with a source of hydraulic pressure fluid.

5. An hydraulic motor adapted to provide a power stroke divided into fixed predetermined increments and comprising a divided piston chamber, a piston rod reciprocally mounted in said chamber and having one end extending outwardly therefrom, a piston fixed to the other end of said piston rod and moveable in one portion of said chamber, a plurality of pistons moveable in the other portion of said piston chamber and carried by said piston rod, releasable friction means carried by each of said plurality of pistons to provide a releasable driving engagement between said plurality of pistons and said piston rod and an hydraulic circuit for supplying hydraulic pressure fluid selectively to each of said pistons to effect both the power stroke and the return movement thereof.

6. A motor cylinder as claimed in claim 5 and further characterized in that a bridge is mounted in said piston chamber to divide it into two parts and further characterized in that said piston rod reciprocally mounted in said chamber extends through said bridge and is supported thereby.

7. A motor cylinder adapted to provide a power stroke divided into fixed predetermined increments and comprising a piston chamber, a bridge in said piston chamber for dividing it into two parts, a piston rod mounted in said chamber and extending through said bridge, and an adjustable pressure exerting friction member carried by said bridge and engaging the surface of said piston rod, a piston fixed on said rod and moveable on one side of said bridge in said chamber, a plurality of moveable pistons slidably mounted on said piston rod and moveable in said piston chamber on the other side of said bridge and releasable friction means carried by each of said plurality of pistons to provide a releasable driving engagement between said plurality of pistons and said piston rod, and an hydraulic circuit for supplying hydraulic pressure fluid selectively to said pistons to effect both power and return movement thereof.

8. An hydraulic motor as claimed in claim 7 and further characterized in that said releasable friction means comprises a locking dog carried by each of said pluarlity of moveable pistons adapted to lock said moveable pistons against sliding movement relative to said piston rod during the power stroke thereof and to release said moveable pistons therefrom at the completion of the power stroke.

9. An hydraulic motor as claimed in claim 7 and further characterized in that each of said locking dogs includes wedging friction exerting member carried by the moveable piston and engaging the surface of said piston rod, and a releasable member for contacting said wedging friction exerting member to increase its frictional engagement with said piston rod during the power stroke of said moveable piston and to release the frictional engagement with said piston rod at the end of the power stroke.

LEWIS E. DAUBENMEYER.

REFERENCES CITED

The following references are of record in the file of this patent:

UNITED STATES PATENTS

| Number | Name | Date |
| --- | --- | --- |
| 553,679 | Kaul | Jan. 28, 1896 |
| 686,352 | Sellers | Nov. 12, 1901 |
| 1,865,105 | Houplain | June 28, 1932 |
| 1,956,906 | Mikaelson | May 1, 1934 |

FOREIGN PATENTS

| Number | Country | Date |
| --- | --- | --- |
| 695 | Great Britain | of 1914 |
| 301,531 | Germany | Nov. 2, 1917 |

Certificate of Correction

Patent No. 2,531,907 November 28, 1950

LEWIS E. DAUBENMEYER

It is hereby certified that error appears in the printed specification of the above numbered patent requiring correction as follows:

Column 4, line 62, strike out "piston 28 causing it to move towards the end of", and insert the same before "the" in line 58, same column; column 7, lines 30 and 37, for the words "A motor cylinder" read *An hydraulic motor*; column 8, line 13, for "pluarlity" read *plurality*; line 21, after "includes" insert *a*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*